United States Patent [19]
Shipp

[11] Patent Number: 5,471,237
[45] Date of Patent: Nov. 28, 1995

[54] SINGLE LENS STEREOSCOPIC VIDEO CAMERA

[75] Inventor: John I. Shipp, Tullahoma, Tenn.

[73] Assignee: Apollo Camer, LLC, Tullahoma, Tenn.

[21] Appl. No.: 156,036

[22] Filed: Nov. 22, 1993

Related U.S. Application Data

[63] Continuation-in-part of Ser. No. 905,278, Jun. 26, 1992, Pat. No. 5,264,925.

[51] Int. Cl.$^6$ .............................. A61B 1/04; A61B 1/06; H04N 7/18
[52] U.S. Cl. .................................. 348/46; 348/53
[58] Field of Search .................................. 348/45, 46, 53, 348/70, 71, 269, 271, 56; 128/6; H04N 7/18

[56] References Cited

U.S. PATENT DOCUMENTS

| | | | |
|---|---|---|---|
| 4,074,306 | 2/1978 | Kakinuma et al. | 348/71 |
| 4,253,447 | 3/1981 | Moore et al. | 128/6 |
| 4,523,224 | 6/1985 | Longacre, Jr. | 348/70 |
| 4,761,066 | 8/1988 | Carter | 350/516 |
| 4,967,264 | 10/1990 | Parulski et al. | 348/271 |
| 5,222,477 | 6/1993 | Lin | 128/6 |
| 5,264,925 | 11/1993 | Shipp et al. | 348/269 |

Primary Examiner—Tommy P. Chin
Assistant Examiner—Richard Lee
Attorney, Agent, or Firm—Waddey & Patterson; Mark J. Patterson

[57] ABSTRACT

A stereoscopic video camera system uses a single objective lens system mounted at the distal end of a surgical endoscope. An electronic shutter is disposed within the optical path between the lens and a video camera/sensor. The shutter has left and right optical zones which are switched between opaque and light transmissive states in response to a drive signal which is synchronized both with the camera/sensor and with stereoscopic viewing glasses having switchable left and right viewing lenses.

6 Claims, 6 Drawing Sheets

| BEG. OF FIELD # | NODE DESIGNATIONS | | | | | | OUTPUTS | | |
|---|---|---|---|---|---|---|---|---|---|
| | D0 | D1 | D2 | D3 | D4 | D5 | RED | GRN | BLU |
| 2 | R1L | — | — | — | — | — | D0 | — | — |
| 3 | G1L | R1L | — | — | — | — | D1 | D0 | — |
| 4 | B1L | G1L | R1L | — | — | — | — | — | — |
| 5 | R2R | B1L | G1L | R1L | — | — | D0 | — | — |
| 6 | G2R | R2R | B1L | G1L | R1L | — | D4 | D3 | D2 |
| 7 | B2R | G2R | R2R | B1L | G1L | R1L | D5 | D4 | D3 |
| 8 | R3L | B2R | G2R | R2R | B1L | G1L | D3 | D2 | D1 |
| 9 | G3L | R3L | B2R | G2R | R2R | B1L | D4 | D3 | D2 |
| 10 | B3L | G3L | R3L | B2R | G2R | R2R | D2 | D1 | D0 |
| 11 | R4R | B3L | G3L | R3L | B2R | G2R | D3 | D2 | D1 |
| 12 | G4R | R4R | B3L | G3L | R3L | B2R | D1 | D0 | D5 |
| 13 | B4R | G4R | R4R | B3L | G3L | R3L | D2 | D1 | D0 |

SINGLE LENS STEREOSCOPIC VIDEO CAMERA

This is a continuation-in-part application of co-pending U.S. patent application Ser. No. 905,278 filed Jun. 26, 1992, for "Single Sensor Video Imaging System and Method Using Sequential Color Object Illumination" now U.S. Pat. No. 5,264,925.

BACKGROUND OF THE INVENTION

The present invention relates generally to stereoscopic video cameras and more particularly to a stereoscopic video camera, system, and method which uses only a single objective lens.

Cameras which can produce images having left and right perspectives which, when viewed concurrently or sequentially, provide depth perception or a "3-D" representation of the object, are conventionally referred to as "stereoscopic" cameras. There are two general types of stereoscopic video camera systems used in the prior art. One type uses dual (left and right) objective lenses, the images from which are directed to and focused on two separate video detectors. The outputs of each of these detectors are then processed and alternately displayed on a video monitor. However, to create the desired three dimensional stereoscopic video effect, the video monitor must be viewed with special glasses. These special glasses have left and right lenses which are alternately switched between light transmissive and opaque states, in synchronization with the alternating switched images displayed on the monitor. Thus, the viewer sees left and right hand perspective views of the object, resulting in a composite image on the screen capable of providing depth perceptive information to the viewer using the special glasses. The full image is seen concurrently because of the persistence of the monitor and of the viewer's eyes.

The second type of prior art stereoscopic video camera is a variation of the dual lens/detector system described above. In this second system, the images from each of the lenses are superimposed on a single detector. However, the images are separated in time by dual shutters that alternate between the images produced by the left and right lenses. Consequently, the output of the single detector alternates between the two perspectives given by the left and right lenses. Again, special glasses synchronized with the lens shutters are necessary to view the image on the monitor in such a way that depth perception is obtained.

There is also known in the prior art a method of forming still stereoscopic images using a single lens system. For example, in U.S. Pat. No. 4,761,066, issued to Carter, a system is described whereby still images are generated using a polarizing material to separate the two stereoscopic perspectives with a single objective lens.

Finally, U.S. Pat. No. 5,222,247 teaches the use of shuttered pupils or apertures within the optical path of an endoscopic camera lens system. However, the '247 device does not take advantage of the full circumference of the camera tube in its pupillary system nor does it offer an improved sequential color illumination and imaging method. The use of the full lens aperture adds valuable depth information and improves sensitivity.

In the case of surgical endoscopes and the like, where a need for a reduction in complexity and volume occupied by the lens system of a video camera is present, it would be preferable to have a stereoscopic video camera which can generate the image using a single lens. Such a device is lacking in the prior art.

SUMMARY OF THE INVENTION

An object of the present invention is to provide a stereoscopic video camera system which uses a single lens.

Another object of the present invention is to reduce the complexity and size of a stereoscopic video camera system so that it is more readily adaptable for use with a surgical endoscope.

Yet another object of the present invention is to provide a stereoscopic video camera system which eliminates flicker while maintaining good spatial and temporal resolution of the resulting image.

A further object of the invention is to increase depth perception detail in a stereoscopic video system while adding sensitivity.

To produce a stereoscopic color video image using a camera system having only a single objective lens system, an electronic shutter is disposed across the entire cross section of the optical path between a conventional single lens and a CCD sensor. The shutter is formed of left and right optical zones which are transversely aligned across the optical path and independently switchable by a shutter drive signal between a light transmissive and opaque state. The shutter drive signal is synchronized with a vertical drive signal such that light is reflected from the object being viewed and focused onto the sensor through the left optical zone. After the light is processed through the left optical zone, the shutter drive signal switches it to the opaque state and the right optical zone is switched to the light transmissive state.

To view the stereoscopic image on a conventional video display, viewing glasses having left and right viewing lenses are used. The left and right viewing lenses are also switchable by an electronic drive signal between an opaque and light transmissive state, in synchronization with the shutter drive signal. The present invention applies to both sequential and non-sequential video cameras.

To achieve the objective of improved depth perception in a sequential camera system, in a second embodiment according to the invention, video data from a color sequentially exposed CCD is delayed for up to five field periods in a non-color specific pipeline memory, while exposure continues for the remaining primary colors at the television field rate. Using a switching matrix, each of the primary color signals is tapped from the memory pipeline and routed to three outputs, one for each primary color. Thus, each primary color exposure is displayed for three field periods before temporal updating. Thus, the system produces alternating odd and even fields for alternating left and right perspective views of the object.

In one embodiment of the device, at least one each of red, green, and blue light emitting diodes are used for the illumination source. The diodes are also sequentially turned on in synchronization with the field period.

The present invention also lends itself to an embodiment which provides for simple wireless transmission to a remote site, in that the use of LED light sources integral to the video sensor head of the device eliminates the need for fiber optic or other cables connected to an external light source.

DESCRIPTION OF THE PREFERRED EMBODIMENT

Figure 1:
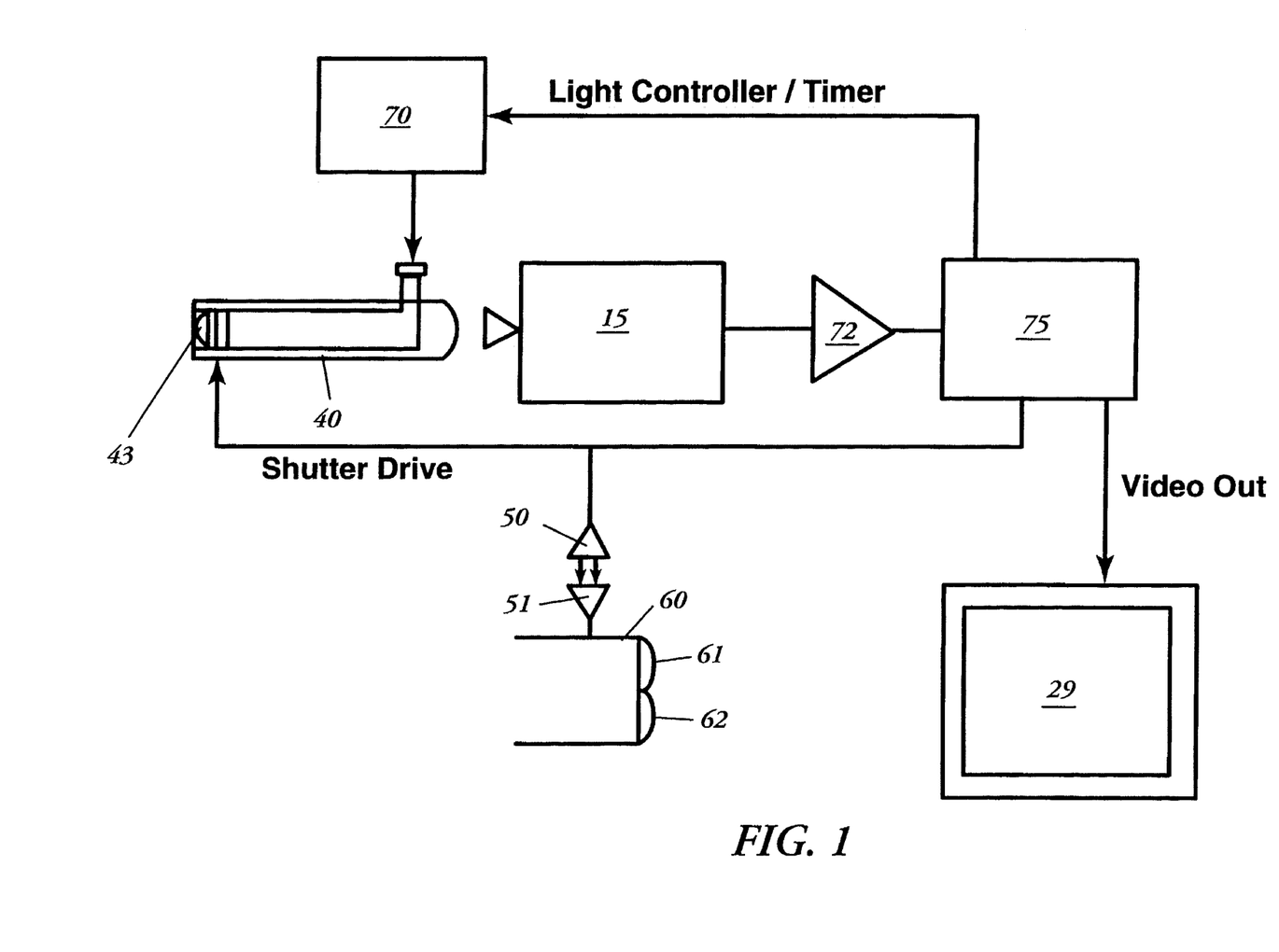
FIG. 1 is a block diagram of the stereoscopic video camera system of a first embodiment of the present invention, using a conventional white light source, or any color sequential light source, and a color video camera, and including stereoscopic viewing glasses connected to a viewing lens drive signal by wireless remote.

FIG. 1 is a block diagram representation of a first embodiment of the system of the present invention adapted for use with a standard sequential or non-sequential illumination source 70 and a conventional prior art color video camera/sensor unit 15. Illumination source 70 directs light through optical fiber cables at an object which is proximate to the distal end of an optical tube, in this embodiment endoscope 40 which includes a single lens system 43 and an electronic shutter 45, mounted within a protective sheath 71. Light reflected from the object is focused by lens system 43 onto the sensor of camera 15, preferably a charge coupled device (CCD). The analog electrical video signal from camera 15 is then digitized in A/D converter 72 and communicated to digital signal processor (DSP) 75 by a hardwired or wireless radio link.

DSP 75 also contains video buffer and timer circuitry which generates timing signals for the system. Accordingly, DSP 75 is used to generate a synchronous shutter drive signal which is sent to both shutter 45 of endoscope 40 as well as to left and right viewing lenses 61 and 62 of viewing glasses 60. The signal is transmitted either by a hardwire link or, as shown in FIG. 1, by means of wireless transmitter 50 and receiver 51.

Figure 7:
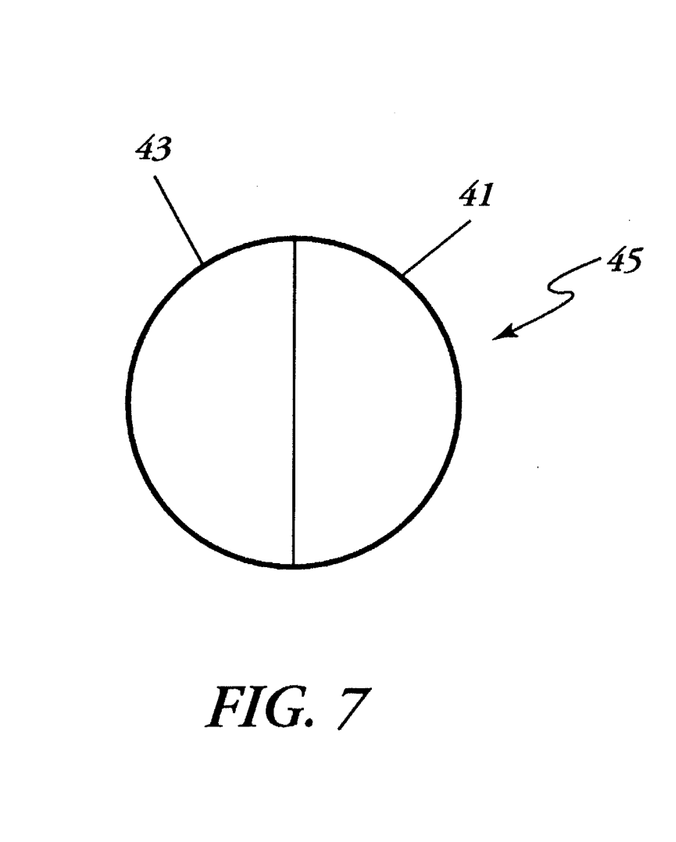
FIG. 7 is a plan view of the electronic shutter component of the present invention as used in either embodiment.

When using conventional camera/sensor 15 to provide a color right and left perspective image, each of the three primary colors can be sensed simultaneously to create an odd field video image and then again to create an even field image. Subsequently, a change in the shutter drive signal from DSP 75 to a "low" state causes shutter 45 to switch from a left to a right eye perspective, as shown in FIG. 7 and as described in greater detail below. This process repeats continuously as camera/sensor 15 supplies right and left perspective video images to display 29. The frequency of the shutter drive signal, preferably 120 HZ, is chosen to exceed the rate at which the eye perceives flicker.

Camera 15 can be either a standard non-sequential type, a standard sequential type, or use the novel sequential color imaging system described below. In a non-sequential embodiment, DSP 75 will also be used to control the light level by sending a driving signal to a shutter (not shown) in illumination source 70. In a sequential embodiment, DSP 75 will also control sequential color timing by either driving a color wheel or by controlling the sequence of color LED illumination.

The buffers in DSP 75 are used to store video data so that the rate of data received from camera 15 and the frequency of the shutter drive and viewing glasses synchronization signals can be varied by repeating or skipping data. In this way, differences in data input and output rates can be compensated for. The video output of DSP 75 can be in any known format known to those skilled in the art, such as NTSC, PAL, or RGB.

Figure 2:
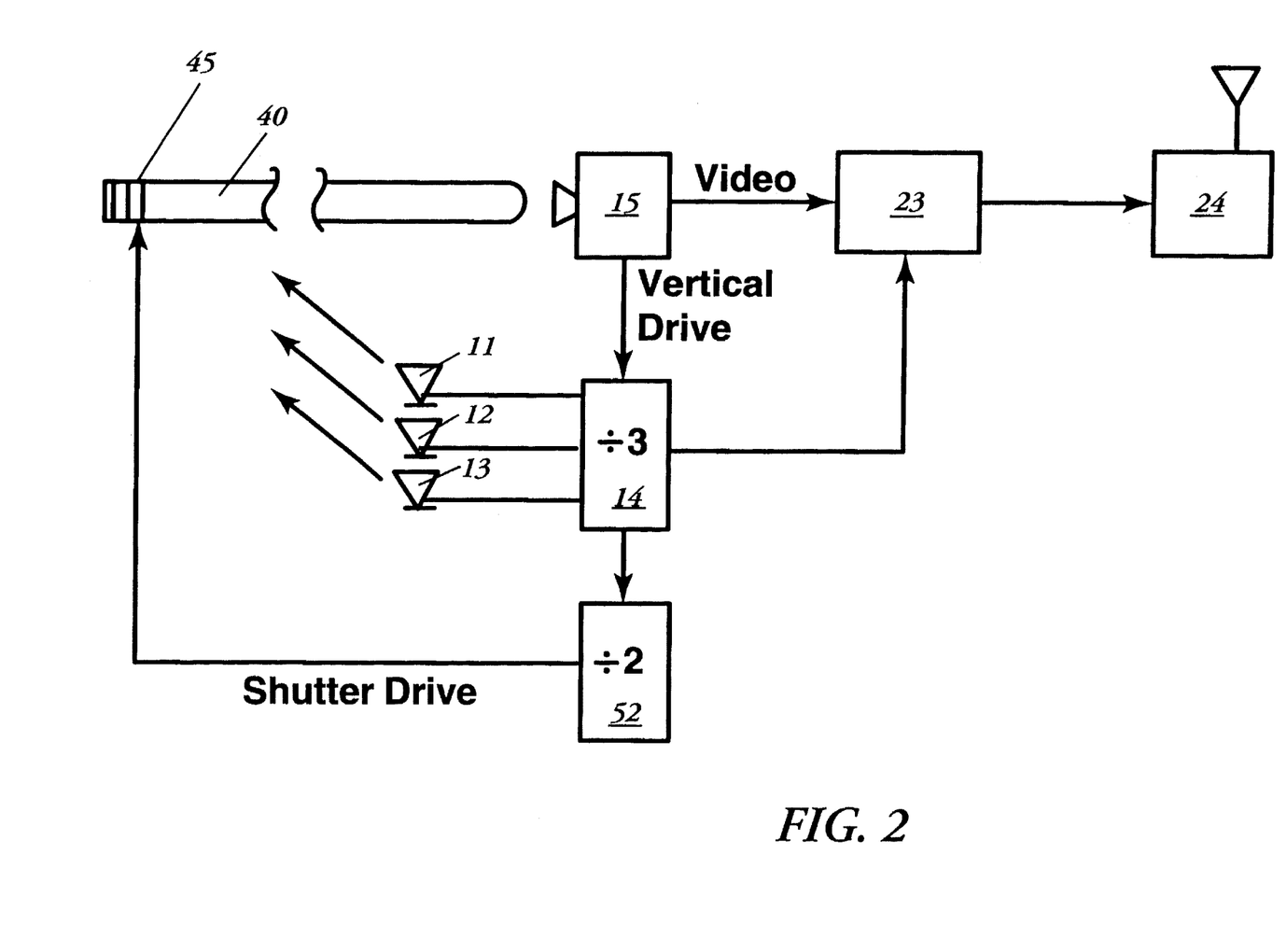
FIG. 2 is a block diagram of the video head-transmitter unit of a second embodiment of the present invention which uses a single sensor and sequential color object illumination.
Figure 3:
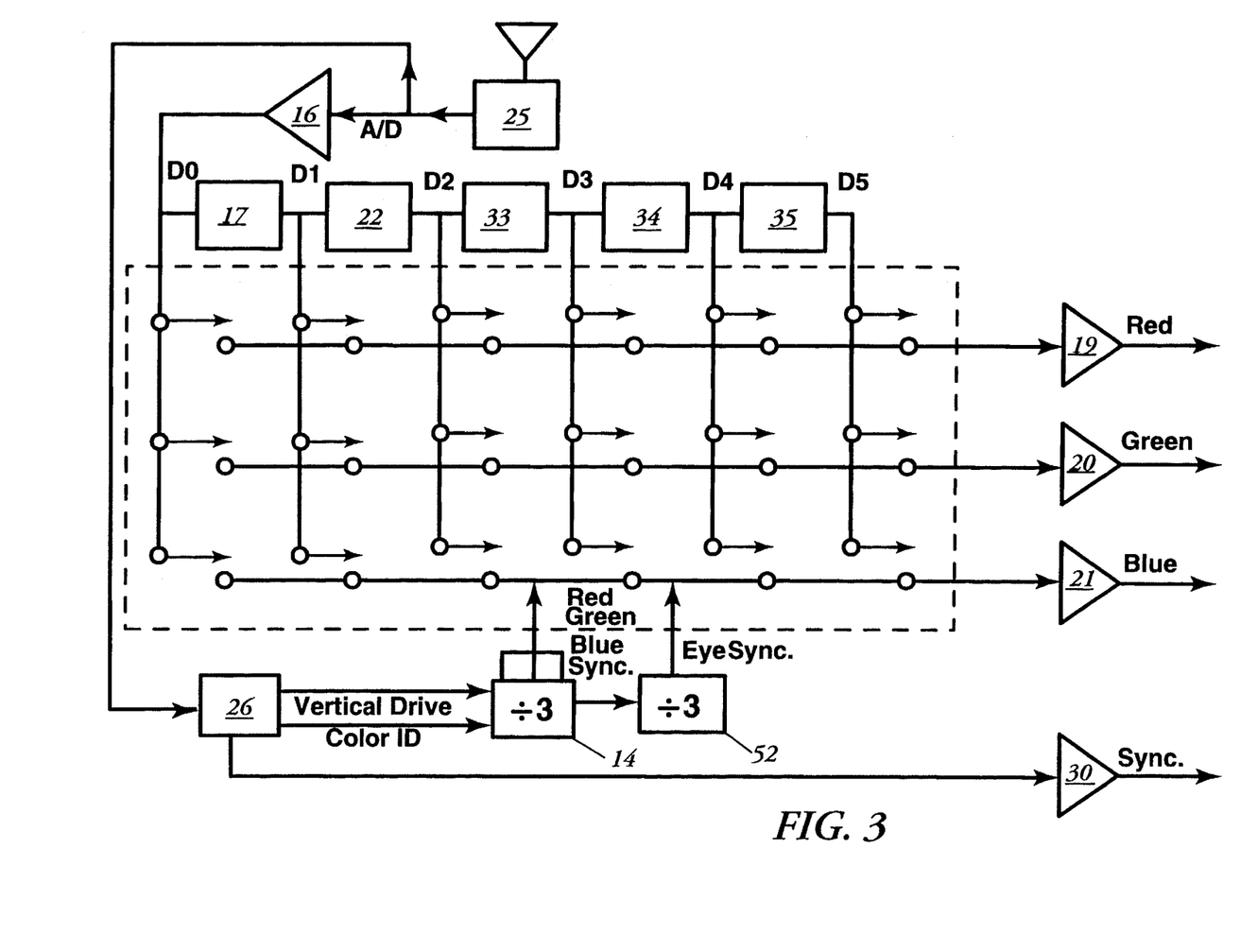
FIG. 3 is a block diagram representation of the receiver processor unit of the second embodiment of the present invention.

Referring to FIGS. 2 and 3, there is shown by block diagram representation a second embodiment of the system of the present invention in which the object to be viewed is sequentially illuminated by three colors, the three primary colors, for example. Light generated by first, second, and third primary color illumination devices 11, 12, and 13, preferably red, green, and blue light emitting diodes (LED), is directed to an object (not shown) proximate the distal end of a surgical endoscope 40. Light reflected from the object is focused onto a sensor 15 by a single objective lens system 43 (FIG. 6), also of conventional design, mounted in a surgical endoscope 40. Sensor 15 is preferably a conventional charge coupled device (CCD) assembly, such as the model CCB/M27 from Sony Corporation of America. However, any appropriate photo sensor array can be used.

An electronic shutter 45 is also mounted within endoscope 40, for example proximate to lens 43 within the optical path between lens 43 and sensor 15. Lens 43 and shutter 45 focus and transmit light reflected from the object which has been illuminated by first, second, and third primary color light sources 11, 12, and 13 (FIG. 2).

Figure 6:
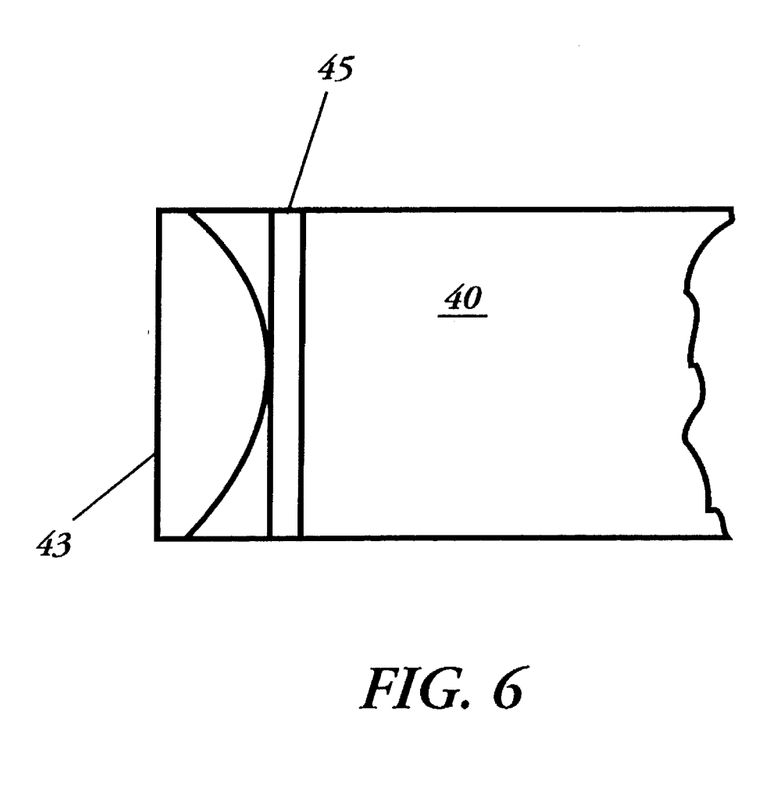
FIG. 6 is an enlarged cut-away side view of the distal end of the endoscope component of the present invention as used in either embodiment.

FIG'S. 6 and 7 provide greater detail of electronic shutter 45 interposed within endoscope 40 between objective lens 43 and the optical output of endoscope 40, as used in either embodiment of the camera system. Looking particularly at FIG. 7, shutter 45 is actually made from two "D" shaped liquid crystal display (LCD) devices which are capable of assuming varying light transmissive states in response to variations in an applied voltage. The two LCD's are aligned transversely across the optical path within endoscope 40 and define electrically isolated right and left optical zones 41 and 43 which, in a preferred embodiment, together occupy substantially all of the interior cross sectional area of endoscope 40. In the preferred embodiment, left and right optical zones 41 and 43 of shutter 45 are wired such that a low level drive signal from ring counter 52 causes left optical zone 43 to become opaque while the right optical zone 41 is light transmissive, and vice versa.

Of course, means other than an LCD shutter can be used to alternately close part of the optical path, including mechanical devices. Also, a means for switching the polarization of light emitted from monitor 29 can be used, whereby the viewed image alternates between vertical and horizontal polarization in synchronization with shutter 45. In this manner, a viewer using polarized rather than shuttered viewing glasses 60 can perceive depth in the viewed image.

It will be apparent to those skilled in the art that although FIG. 6 shows only a single objective lens element, endoscopes and the like, including that used in the systems described here, will actually have a lens system having multiple lens elements colinearly aligned along a single optical path. Thus, references herein to a "single lens" are intended to include such single lens "systems."

Again referring to FIG. 2 and 3, sensor 15 produces an analog signal responsive to the level of light reflected thereon from endoscope 40. Such signals are then passed to a conventional add color ID circuit 23, which tags the video signals from sensor 15 with an identifying pulse denoting which primary color is then represented by the video signal.

A conventional vertical drive signal is transmitted from sensor 15 to a divide by three ring counter 14, the output of which selectively drives primary color light sources 11, 12, and 13. A second divide by two ting counter 52 is also connected to the vertical drive signal of sensor 15 and is used to produce a synchronous shutter drive signal for shutter 45 of endoscope 40.

The output of add color ID circuit 23 is then delivered to video display device 29. Display 29 can be a conventional RGB monitor (not shown) or an NTSC encoder with NTSC-Y/C television monitor, also of a conventional design. In either case, a conventional television synchronization signal is also delivered to display 29 by means of a conventional sync separator circuit 26 and driver amplifier 30 (FIG. 3).

As shown on FIG. 2, the output of the add color ID circuit 23 can be coupled to the receiver/processor unit of the system by means of a wireless transmitter/antenna unit 24 which sends signals by wireless communication to an antenna/receiver unit 25 (FIG. 3). Alternatively, the units can be hard wired.

To view the stereoscopic image produced on display 29 in either embodiment, special stereoscopic viewing glasses 60 must be used. As seen in FIG. 1, viewing glasses 60 include separately operable left and right viewing lenses 61 and 62 which are operatively connected to the rest of the system by hardwiring or, as shown on FIG. 1, by means of viewing glasses transmitter 52 and viewing glasses receiver 51. A viewing lens drive signal, synchronized to the shutter drive signal and vertical drive signal from ring counter 14 and ring counter 52 is transmitted by the hardwired or wireless link between glasses 60 and ring counter 52.

The stereoscopic video imaging system described above is ideally suited for use in a manner consistent with applicant's "Single Sensor Video Imaging System and Method Using Sequential Color Object Illumination", described in detail in co-pending U.S. patent application Ser. No. 905, 278, the specification and drawings of which, as amended, are incorporated herein by reference. The method by which an object to be viewed is illuminated and a stereoscopic color video image data is processed in this second embodiment of the system is shown on FIGS. 2–5. The method begins by sending a "high" shutter drive signal from ring counter 52 to shutter 45, causing left optical zone 43 to become transparent and right optical zone 41 to assume an opaque state. Concurrently, an object (not shown) is illuminated with light from a first primary color light source 11, a red light emitting diode (LED) for example, for a period of time typically equal to a standard television field period. Conventionally, this period is 1/60 second although other periods can be used. The red first primary light source 11 is activated for this first field period by one of three outputs from the divide by three ring counter 14, which has been selected by the vertical drive signal of the sensor 15. While sensor 15, an integrating device, is accumulating the level of the first primary color light reflected from the object during this first field period, no video image output dam is obtained.

Figure 4:
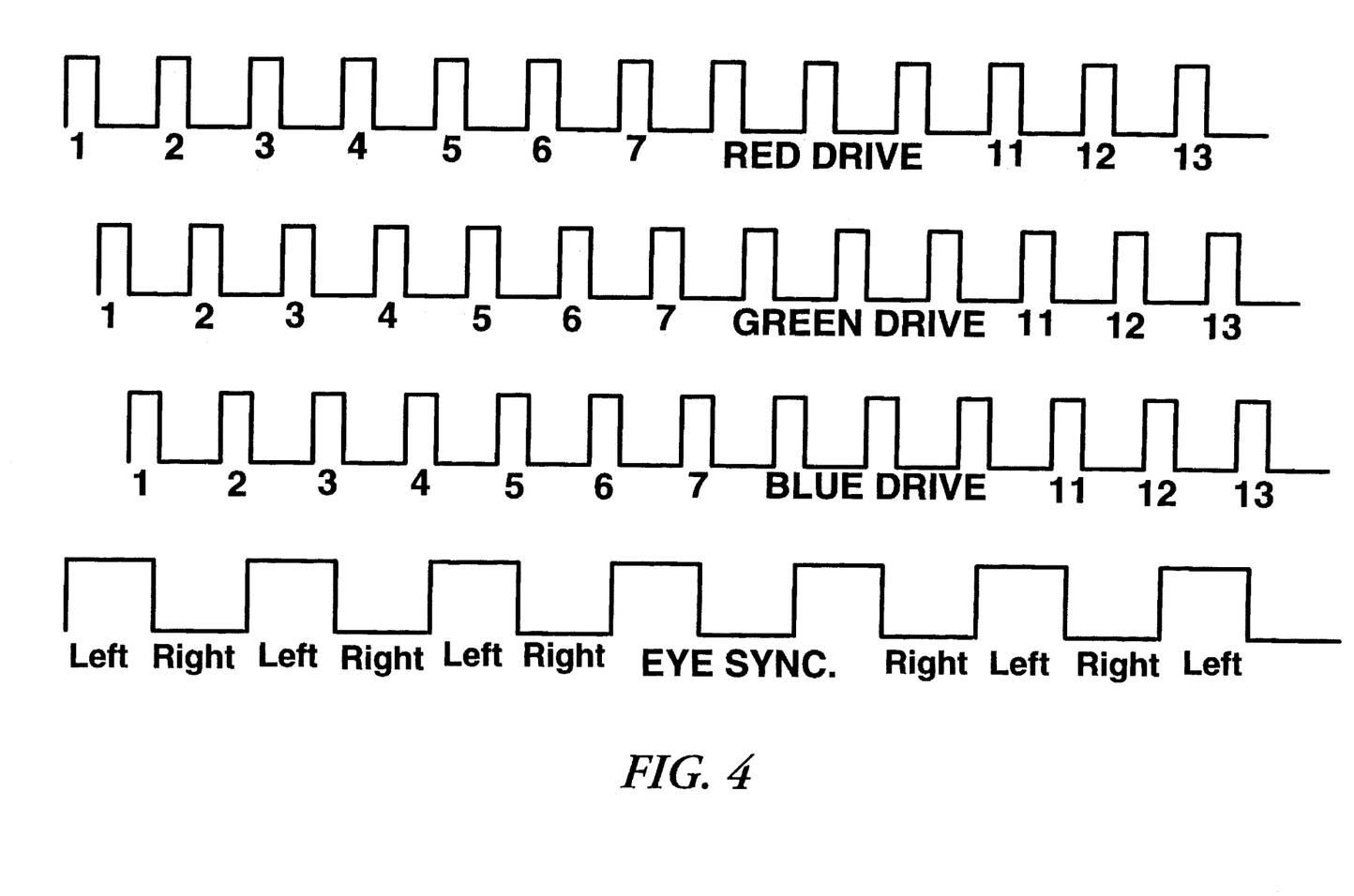
FIG. 4 is a timing diagram showing the timing relationship in the second embodiment of the system among the respective LED drive signals and including the synchronizing drive signals for the electronic shutter and viewing glasses.

As shown on FIG. 4, at the end of the first field period the vertical drive signal makes a transition and thereby selects the second output of the ring counter 14, resulting in the deactivation of the first light source 11 and the activation of the second primary light source 12, a green LED for example, for one field period. The state of the delay units 17, 22, 33, 34 and 35 and outputs of digital-to analog converters at the beginning of the second field period is shown on the first line of the table of FIG. 5. Thus, during this second field period, analog data measuring the response of sensor 15 to first light source 11 is captured by analog-to-digital (A/D) converter 16 while integration of the second signal (from second light source 12) is occurring in sensor 15.

The output signals of ring counter 14 are timed and synchronized such that matrix switch 18 connects the output of A/D 16 (reference D0 on FIGS. 3 and 5) to first digital-to-analog converter (DAC) 19 and to first delay unit 17. First delay unit 17 delays the digitized signal for a time period equal to one field period. First DAC 19 converts the first captured and digitized primary color signal corresponding to the first primary color, from first light source 11, back to analog form, to be used as the odd field, left eye analog video data of the first primary color signal, red for example, as shown on the first line of the table in FIG. 5.

Following the second field period, the object is illuminated by a third primary color light source 13, a blue LED for example, for a third period of time equal to a field period. This is accomplished by the vertical drive signal from the sensor 15 making a transition, thereby deactivating second light source 12 and activating third light source 13. During this third field period, the third primary color light reflected from the object is focused onto sensor 15. Simultaneously with integration of the third primary color signal in sensor 15, the analog video signal corresponding to the level of reflected second primary color light is captured and digitized by A/D 16. At the beginning of this third field period, the outputs of the ring counter 14 are in such a state as to connect the output from the A/D 16 (D0) to second DAC 20, and the output from first delay 17 (D1 on FIG. 3) to first DAC 19. Thus, response of the sensor 15 to the first primary color signal, from LED 11, is again presented at the output of first DAC 19 for the even field, left eye analog video data of the first primary color. The output of second DAC 20 is the even field, left eye analog video signal corresponding to the second primary color from LED 12, green for example, as shown on the second line of the table in FIG. 5.

Following the third field period, the shutter drive signal, synchronized with the vertical drive signal, is driven "low" by the ring counter 52 and remains in such state for the fourth, fifth, and sixth field periods. This causes left optical zone 43 of shutter 45 to become opaque, and right optical zone 41 to be light transmissive. During the fourth field period, the object is again illuminated with first primary color light source 11 for a fourth period of time equal to a standard field period. This is accomplished by the vertical drive signal of sensor 15 making a transition which causes third light source 13 to be deactivated and first light source 11 to again be activated. The third color analog signal is captured from sensor 15 and digitized by the A/D 16 during this fourth field period, while the first color light signal is again being integrated.

The second color captured and digitized signal is delayed by first delay 17 and the first color digitized signal is further delayed by one field period by second delay unit 22. At the beginning of the fourth field period, the outputs of ring counter 14 are such that the outputs D3, D4, and D5 of third, fourth and fifth delay units 33, 34, and 35 are connected to first, second and third DAC's 19, 20, and 21 respectively. However, as seen on the third line of the table in FIG. 5, at this point in the process, no image data signal has yet been provided to these delay units so there is in, in fact, no viewable data presented to display 29.

Figure 5:
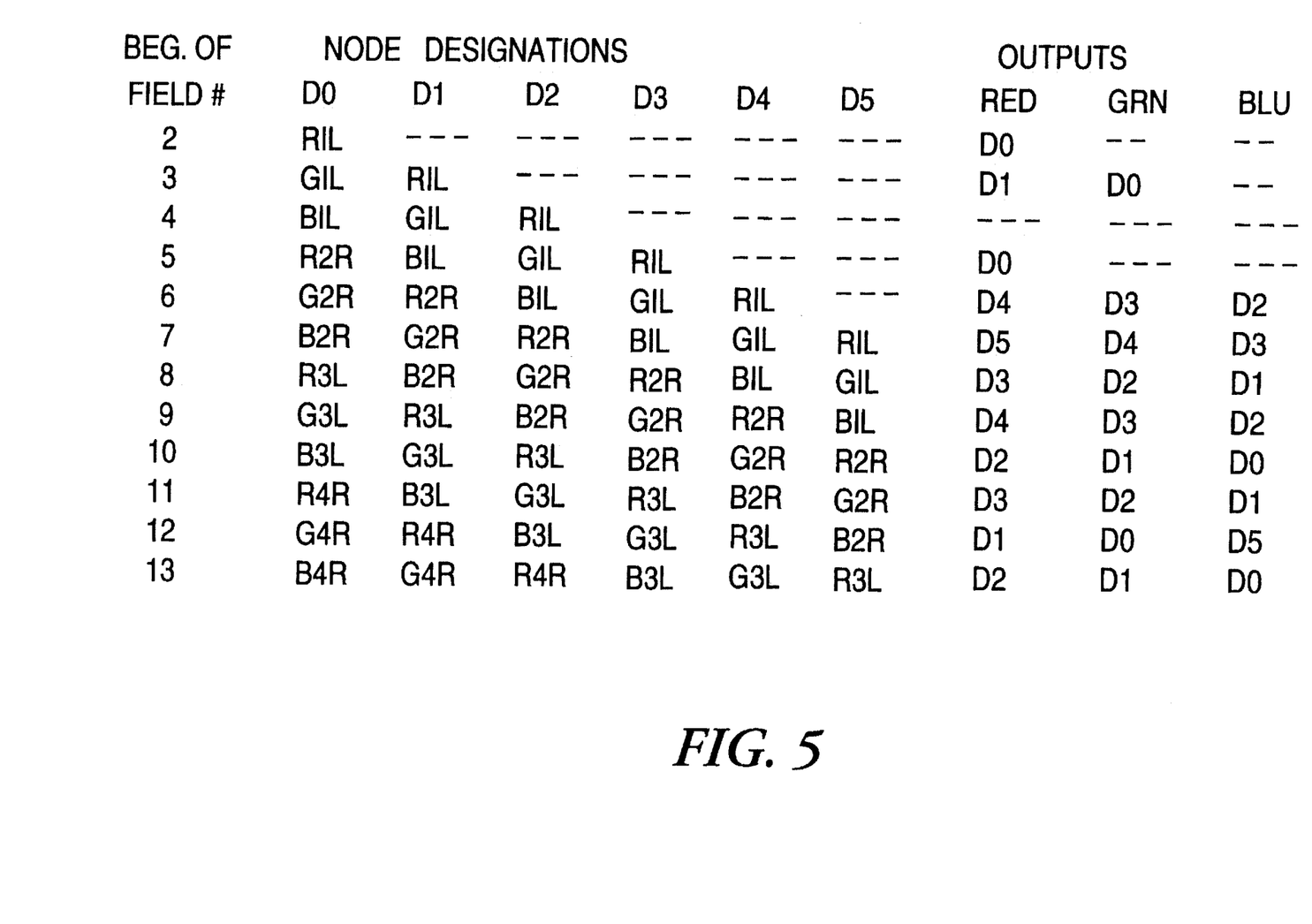
FIG. 5 is a table showing the timing relationship in the second embodiment of the system among the respective vertical and shutter drive signals, standard television video fields, and output signals from the A/D and delay units. The first line of the table in FIG. 5 represents the output states (nodes D0–D5) of delay units 17, 22, 33, 34, and 35) and the output states of DAC's 19, 20, and 21 at the beginning of the second field period, after integration of the first primary color reflected light.

The process continues as shown in FIG.'S 3 and 5 with, for example, the red or first primary color signal from the left perspective view taken during the first field moving successively from first delay unit 17 to fifth delay unit 35. Matrix switch 18 continues to address the three nodes (D0 through D5) that contain the required data to generate the R, G, and B video signals respectively. For example, at the end of the eighth field period, matrix switch 18 is in such a state that the output of fourth delay unit 34 (D4) is connected to DAC 19 to provide the R output, the output of third delay unit 33 (D3) is connected to DAC 20 to provide the G output, and the output of second delay unit 22 (D2) is connected to third DAC 21 to provide the B output, thereby forming the even field, right side video signal. Further, after each of the three primary colors are illuminated, the shutter drive signal from ring counter 52 switches shutter 45 from left optical zone 43 to right optical zone 41, or vice versa, to generate a continuing sequence of odd and even fields for the left eye view and odd and even fields for the right eye view.

Each color signal level that is integrated in sensor 15 is moved successively from the output of A/D 16, through first delay unit 17 and on through fourth delay unit 35, so that this data can be continually presented at the appropriate time.

To view the video image in a manner which provides concurrent left and right eye views of the object, thereby providing perspective, the viewing lens drive signal must be synchronized such that when left eye RGB signals are generated at the outputs of DAC's 19, 20, and 21, left lens 61 is light transmissive and fight lens 62 is opaque, and vice-versa.

The process continues, in the manner previously described, according to the timing shown in FIG.'s 4 and 5, with repeated successive illumination or field periods. It will be apparent to those skilled in the art that the first through sixth field or illumination periods are operationally identical to succeeding sequences of six illumination periods, except that the first through sixth illumination periods begin with sensor 15 and/or one or more of delay units 17, 22, 33, 34, and 35 in a starting condition in which one or more of the nodes D0–D5 contain no data.

It should be noted that if precise field period analog delay lines were available it would not be necessary to digitize the output of sensor 15 and then reconvert it to analog format. Rather, the sequential analog signals could be merely switched by matrix switch 18 to their respective color signal outputs.

The output signals from DAC's 19, 20, and 21, after processing in the manner described, now correspond to standard video signals capable of display by a conventional RGB color monitor or conventional NTSC format television receiver, in conjunction with a standard television synchronization signal obtainable from sensor 15, through driver-amplifier 30. Accordingly, in the preferred embodiment, the resulting video image will comprise conventional odd and even frames or fields of data comprising typically 262.5 horizontal lines each which are interlaced and displayed for one standard field period (1/60 second) each, producing a completed television video image of 525 horizontal lines.

A variation of the embodiment of the system shown in FIG. 2 can be implemented in which a separate light source/sensor unit includes a transmitter for sending analog color level signals to a remote receiver-processor unit (FIG. 3). In this embodiment, data from sensor 15 is tagged with a color identifier signal from ring counter 14 by means of a conventional add color ID circuit 23, which tags the video signal with an identifying pulse denoting which primary color is then represented by the video signal. The output of the add ID circuit 23 is then coupled to a wireless transmitter 24 (also of conventional design) from which it is transmitted to a remote site. Add ID circuit 23 and transmitter 24 can be incorporated in the device either prior to or after A/D 16. In the former case the transmission is of analog video data and in the latter case digital data is transmitted. A conventional color sync signal is also transmitted from sync driver-amplifier 30.

Referring now to FIG. 3, the transmitted data is then received by conventional wireless receiver 25. A conventional sync separator circuit 26 strips off the television synchronization signal, the vertical drive signal, and the color ID signal. The latter two signals control ring counter 14 for selecting the appropriate connections to DAC units 19, 20, and 21.

Another embodiment of the present invention (not shown) can be implemented in which the apparatus of FIGS. 3 and 5 is modified by relocation of A/D 16 such that transmission of digital rather than analog data occurs between the transmitter and receiver units.

Although a variety of conventional electronic components and sub-systems can be readily adapted for use in the present invention, in one embodiment A/D 16 is a Brooktree BT208, delay units 17, 22, 33, 34, and 35 are type NEC 42270, DAC units 19, 20, and 21 are each a Brooktree BT106, counter 14 is a National Semiconductor Model CD 4022, and driver-amplifier 30 is an EL2020 from Elantec. Matrix switch 18 can be implemented by any means well known by those skilled in the art, including a microprocessor controlled switching device programmed in a conventional manner to implement the switching pattern and timing shown in FIGS. 4 and 5. A ring counter device which is programmed to perform a non-standard stepping pattern can also be used. Of course, it will be appreciated by those skilled in the art that the resolution and sensitivity of the apparatus and method of the present invention are a function in part of the resolution of the A/D and DAC units, the output levels from light sources 11, 12, and 13, and the sensitivity of sensor 15.

It should be noted that a conventional CCD, as used in the present invention, is an integrating device, meaning that its output is not only a function of the intensity of the light it receives, but such output will continue to increase for as long as the light source remains on. Consequently, depending on the sensitivity needed, and the available intensity of the light sources, it is possible and, in some cases preferable, to activate the primary light sources of the present invention for more or less than a complete standard field period. From a timing point of view in the present invention, it is only necessary that one primary light source be activated during each standard field period, for a period of time equal to or less than such period. Thus, references herein to an "illumination period" are intended to refer to the fixed period of time during which a light source will be activated, and not necessarily the duration of illumination.

Similarly, to improve temporal resolution in the sequential illumination embodiment of the system, chromatic updating can take place at every field period. This can be done by sequentially illuminating the object by each of the three primary colors during each field period and storing the dam, perhaps in color specific memories.

The method and system described herein can also be adapted for monochromatic video imaging.

Thus, although there have been described particular embodiments of the present invention of a new and useful single lens stereoscopic video camera, it is not intended that such references be construed as limitations upon the scope of this invention except as set forth in the following claims.

What I claim is:

1. A stereoscopic video camera system for viewing an object, the system comprising:

a. a lens mounted in an optical tube for focusing light reflected from the object onto a sensor mounted within said optical tube, said sensor responsive to a level of the light reflected from the object focused on said sensor by said lens;

b. said optical tube having a center line and an inner circumferential margin defining an optical path between said lens and said sensor;

c. a shutter mounted transversely across said optical tube, said shutter comprising left and right optical zones, each of said left and right optical zones switchable between a light transmissive state and an opaque state in response to a shutter drive signal; and d. said left and right optical zones each having inner margins immediately adjacent each other proximate said center line of said optical tube and having outer margins proximate said inner circumferential margin of said optical tube, whereby said right and left optical zones together occupy substantially all of said optical path.

2. The system of claim 1 further comprising a video display operatively connected to and responsive to output data from said sensor.

3. The system of claim 2 further comprising wireless means to transmit data from said sensor to a remote location for viewing on said video display.

4. The system of claim 2, further comprising:
   a. viewing glasses having left and right viewing lenses, each of said lenses switchable between a light transmissive state and an opaque state in response to a viewing lens drive signal; and
   b. means to synchronize said viewing lens drive signal with said shutter drive signal whereby when said video display is displaying output data produced when said left optical zone of said shutter was in a light transmissive state, said left viewing lens of said viewing glasses are in a light transmissive state, and when said video display is displaying output data produced when said right optical zone of said shutter was in a light transmissive state, said right viewing lens of said viewing glasses is in a light transmissive state.

5. A method of producing a stereoscopic video image of an object comprising the steps of:
   a. illuminating said object and focusing light reflected by said object onto a sensor through a single lens and through a shutter disposed in an optical tube between said lens and said sensor, said optical tube having a center line and a cross-sectional area defined by an inner circumferential margin;
   b. alternately switching said light reflected by said object between left and right perspective views by alternately opening and closing right and left optical zones of said shutter, said left and right optical zones having inner margins immediately adjacent each other proximate said center ling of said optical tube and outer margins proximate said inner circumferential margin of said optical tube, whereby said left and right optical zones occupy substantially all of said cross-sectional area of said optical tube; and
   c. using the output of said sensor to generate and display viewable left and right perspective video images.

6. The method of claim 5, further comprising synchronizing switchable left and right viewing lenses of view glasses with the display of said left and right perspective video images.

* * * * *